(12) United States Patent
Roberts et al.

(10) Patent No.: US 11,421,712 B2
(45) Date of Patent: Aug. 23, 2022

(54) ROTOR WITH BALANCING FEATURES AND BALANCING METHOD

(71) Applicant: Garrett Transportation I Inc, Torrance, CA (US)

(72) Inventors: Quentin Roberts, Nancy (FR); Gautam Singh, New Delhi (IN); Karunakaran Ealumalai, Bangalore (IN); Laurentiu Baluta, Burcharest (RO); Rado Rychvalsky, Zaborske (SK)

(73) Assignee: GARRETT TRANSPORTATION I INC, Torrance, CA (US)

( * ) Notice: Subject to any disclaimer, the term of this patent is extended or adjusted under 35 U.S.C. 154(b) by 0 days.

(21) Appl. No.: 17/301,167

(22) Filed: Mar. 29, 2021

(65) Prior Publication Data

US 2021/0215172 A1   Jul. 15, 2021

Related U.S. Application Data

(62) Division of application No. 16/190,864, filed on Nov. 14, 2018, now Pat. No. 10,989,224.

(51) Int. Cl.
   *F01D 5/02* (2006.01)
   *F04D 29/66* (2006.01)
   *G01M 1/34* (2006.01)

(52) U.S. Cl.
   CPC ......... *F04D 29/662* (2013.01); *F01D 5/027* (2013.01); *G01M 1/34* (2013.01); *F05D 2220/40* (2013.01)

(58) Field of Classification Search
   CPC ...... F01D 5/027; F04D 29/662; F04D 29/668; G01M 1/34; F16F 15/32
   See application file for complete search history.

(56) References Cited

U.S. PATENT DOCUMENTS

| 5,487,640 | A | 1/1996 | Shaffer |
| 2006/0250033 | A1 | 11/2006 | Vasilescu et al. |
| 2015/0322793 | A1 | 11/2015 | Takabatake et al. |
| 2015/0354360 | A1 | 12/2015 | Le Strat et al. |
| 2016/0325402 | A1 | 11/2016 | Mitchell, Jr. et al. |
| 2016/0363134 | A1 | 12/2016 | Seike et al. |
| 2017/0074103 | A1 | 3/2017 | House |
| 2018/0313366 | A1 | 11/2018 | Lehmayr et al. |
| 2019/0145430 | A1 | 5/2019 | Feustel et al. |

FOREIGN PATENT DOCUMENTS

| DE | 102015103670 A1 | 9/2016 |
| DE | 102016112521 A1 | 1/2018 |
| WO | 2012084455 A1 | 6/2012 |

*Primary Examiner* — Richard A Edgar
*Assistant Examiner* — Behnoush Haghighian
(74) *Attorney, Agent, or Firm* — Lorenz & Kopf LLP (57) ABSTRACT

A rotor for a fluid machine includes a wheel that is supported for rotation about an axis of rotation. The wheel includes a back wall with an outer rim edge. The rotor also includes a plurality of blades that are attached to the back wall and that are spaced apart about the axis of rotation. Moreover, the rotor includes an inter-blade area on the back wall between neighboring ones of the plurality of blades. Furthermore, the rotor includes a balancing feature that is included in the inter-blade area on the back wall. The balancing feature intersects and defines part of the outer rim edge.

5 Claims, 8 Drawing Sheets

ROTOR WITH BALANCING FEATURES AND BALANCING METHOD

CROSS REFERENCE TO RELATED APPLICATION

This application is a divisional of U.S. patent application Ser. No. 16/190,864, filed Nov. 14, 2018, the entire disclosure of which is incorporated by reference.

TECHNICAL FIELD

The present disclosure generally relates to a rotor for a rotary machine and, more particularly, relates to a rotor with balancing features and a balancing method for a rotor, such as a rotor of a turbocharger.

BACKGROUND

Fluid machines include a rotor that is supported for rotation therein. The rotor rotates to convert energy of a fluid into mechanical energy or vice versa. For example, vehicle turbochargers include a rotor that rotates within a housing. The rotor may be driven in rotation for boosting the performance of an internal combustion engine. More specifically, these devices can increase the engine's efficiency and power output by forcing extra air into the combustion chamber of an engine.

The rotor preferably may be supported for balanced rotation about a rotation axis. Undesirable vibration or other loads may be reduced if the rotor is sufficiently balanced. However, the balancing method may detrimentally affect the strength or other properties of the rotor. Furthermore, there may be insufficient access to the rotor for performing conventional balancing methods. Also, the balancing method may be difficult, inconvenient, labor-intensive, etc.

Thus, it is desirable to provide a rotor with improved balancing features. It is also desirable to provide a balancing method that accurately and precisely balances the rotor, and that maintains the integrity of the rotor. Furthermore, it is desirable to provide an improved balancing method that is convenient, accurate, and that increases manufacturing efficiency. Other desirable features and characteristics of the present disclosure will become apparent from the subsequent detailed description and the appended claims, taken in conjunction with the accompanying drawings and this background discussion.

BRIEF SUMMARY

In one embodiment, a rotor for a fluid machine is disclosed. The rotor includes a wheel that is supported for rotation about an axis of rotation. The wheel includes a back wall with an outer rim edge. The rotor also includes a plurality of blades that are attached to the back wall and that are spaced apart about the axis of rotation. Moreover, the rotor includes an inter-blade area on the back wall between neighboring ones of the plurality of blades. Furthermore, the rotor includes a balancing feature that is included in the inter-blade area on the back wall. The balancing feature intersects and defines part of the outer rim edge.

In addition, a method of balancing a rotor for a fluid machine is disclosed. The method includes determining a balancing model for a wheel that is supported for rotation about an axis of rotation. The wheel includes a back wall and a plurality of blades. The plurality of blades is attached to the back wall and spaced apart about the axis of rotation. An inter-blade area on the back wall is defined between neighboring ones of the plurality of blades. The method also includes removing, with a removal tool, material from the wheel at the inter-blade area according to the determined balancing model, including rotating at least one of the wheel and the removal tool relative to the other about the axis of rotation to produce a balancing aperture in the back wall. The balancing aperture extends along an arcuate major axis that is substantially centered on the axis of rotation.

In an additional embodiment, a rotor for a fluid machine is disclosed. The rotor includes a wheel that is supported for rotation about an axis of rotation. The wheel includes a back wall. The back wall includes a front face and a back face. Moreover, the rotor includes a plurality of blades that are attached to the front face of the back wall and that are spaced apart about the axis of rotation. Additionally, the rotor includes an inter-blade area on the front face of the back wall between neighboring ones of the plurality of blades. The rotor further includes a balancing aperture in the front face in the inter-blade area. The balancing aperture is elongate and has a major axis that is arcuate. The major axis is centered substantially on the axis of rotation.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a rotor of a fluid machine, such as a turbocharger or other charger device of a vehicle. The rotor may include a compressor wheel that is supported for rotation about an axis of rotation. The compressor wheel may include a back wall and plurality of blades that are attached to the back wall and spaced apart about the axis of rotation. Furthermore, the rotor may include at least one balancing feature, such as an aperture, that is included in an inter-blade area on the back wall. The balancing feature may intersect and define an outer rim edge of the back wall. Moreover, in some embodiments, the balancing feature may be elongate with a major axis that is arcuate and centered substantially on the axis of rotation. Methods of manufacturing and methods of balancing these rotors are also disclosed according to example embodiments of the present disclosure.

Accordingly, rotors may be accurately balanced according to the present teachings in an efficient and repeatable fashion. In some embodiments, at least one balancing feature may be located proximate the outer rim edge in the inter-blade area of the back wall of the compressor wheel. This location may be highly accessible, thereby increasing efficiency of the balancing method. Moreover, disposing the balancing feature in this location may ensure that the wheel has high strength.

Figure 1:
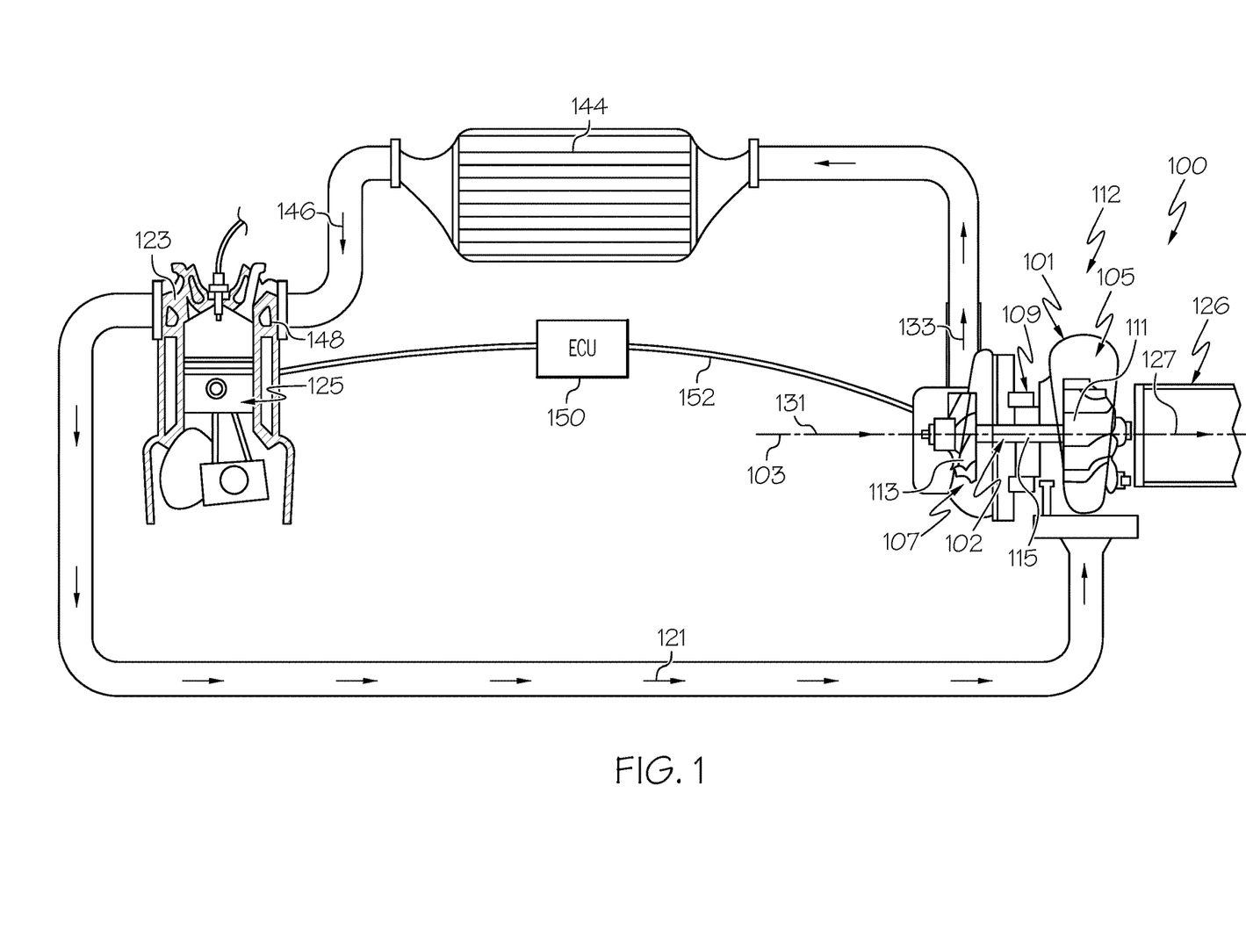
FIG. 1 is a schematic view of a turbocharger system with a rotor that is balanced according to example embodiments of the present disclosure.

FIG. 1 is a schematic view of an example turbocharger system 100 that includes a turbocharger 112. The turbocharger 112 generally includes a turbocharger housing 101 and a rotor 102. The rotor 102 is configured to rotate within the turbocharger housing 101 about an axis of rotor rotation 103. The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis of rotation 103, through the bearing housing 109, to connect the turbine wheel 111 to the compressor wheel 113. Accordingly, the turbine wheel 111 and the compressor wheel 113 rotate together about the axis 103.

The turbine housing 105 and the turbine wheel 111 cooperate to form a turbine (i.e., turbine section, turbine stage) configured to circumferentially receive a high-pressure and high-temperature exhaust gas stream 121 from an engine (e.g., from an exhaust manifold 123 of an internal combustion engine 125). The turbine wheel 111 and, thus, the rotor 102 are driven in rotation around the axis 103 by the high-pressure and high-temperature exhaust gas stream 121, which becomes a lower-pressure and lower-temperature exhaust gas stream 127 that is released into a downstream exhaust pipe 126. In other embodiments, the engine 125 may be of another type, such as a diesel fueled engine.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized air stream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream 133 is characterized by an increased temperature, over that of the input air 131.

The pressurized air stream 133 may be channeled through an air cooler 144 (i.e., intercooler), such as a convectively cooled charge air cooler. The air cooler 144 may be configured to dissipate heat from the pressurized air stream 133, increasing its density. The resulting cooled and pressurized output air stream 146 is channeled into an intake manifold 148 of the internal combustion engine 125, or alternatively, into a subsequent-stage, in-series compressor. The operation of the system 100 may be controlled by an ECU 150 (engine control unit) that connects to the remainder of the system via communication connections 152.

Figure 2:
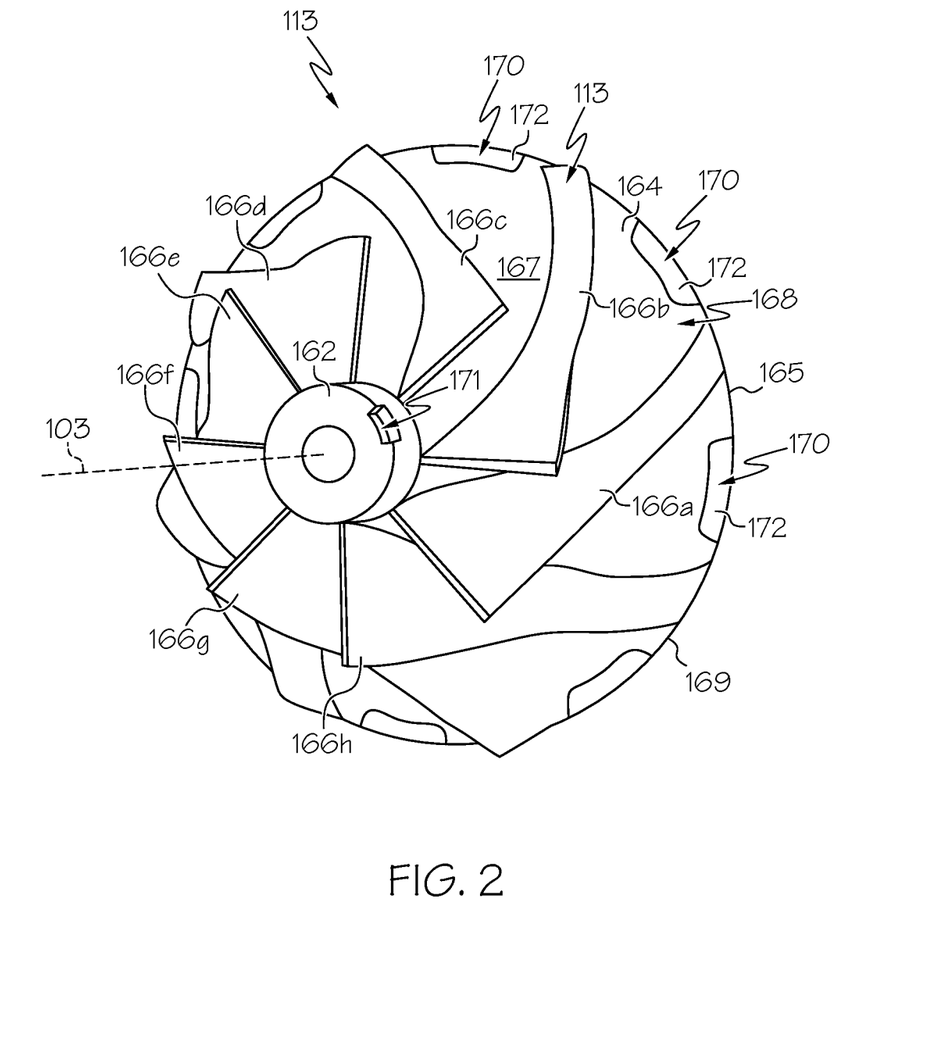
FIG. 2 is a perspective view of a compressor wheel of the rotor of FIG. 1 according to example embodiments.
Figure 3:
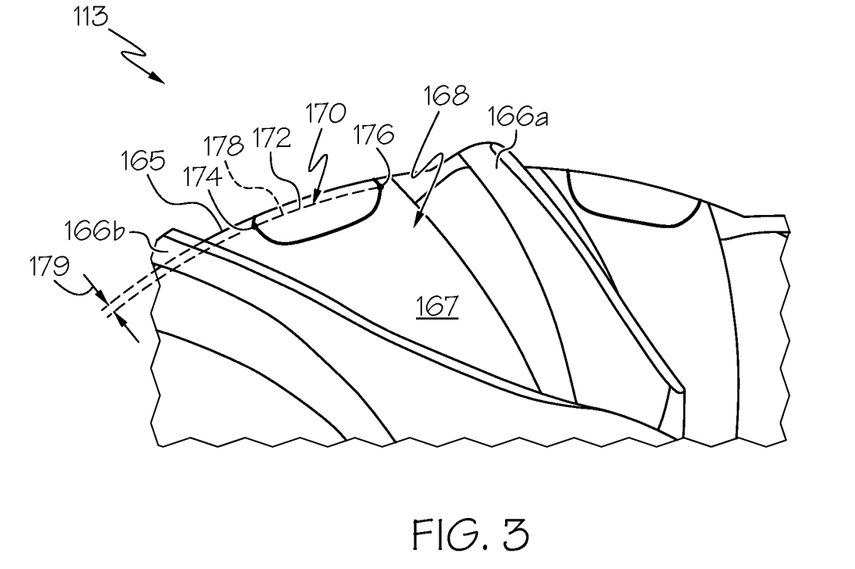
FIG. 3 is an end view of the compressor wheel of FIG. 2 with balancing features according to example embodiments.

Referring now to FIGS. 2 and 3, additional details of the rotor 102 will be discussed according to example embodiments. Specifically, the compressor wheel 113 of the rotor 102 is illustrated according to example embodiments. As will be discussed, the compressor wheel 113 may include one or more balancing features 170 that balance the rotor 102 in rotation about the axis 103. It will be appreciated that one or more balancing features 170 may be included on the rotor 102 in a location other than the compressor wheel 113 without departing from the scope of the present disclosure. Furthermore, it will be appreciated that balancing features 170 may be included on another rotor (e.g., a rotor of a supercharger or e-charger) without departing from the scope of the present disclosure.

In some embodiments, the compressor wheel 113 may be a unitary, one-piece member that is made out of metal or other material. In some embodiments, the compressor wheel 113 may be formed at least partly by a casting process.

As shown, the compressor wheel 113 may include a hub 162. The hub 162 may be cylindrical and may receive the shaft 115 of the rotor 102. The hub 162 may be fixed to the shaft 115 (e.g., with a nut or other fastener) for rotation therewith.

Figure 9:
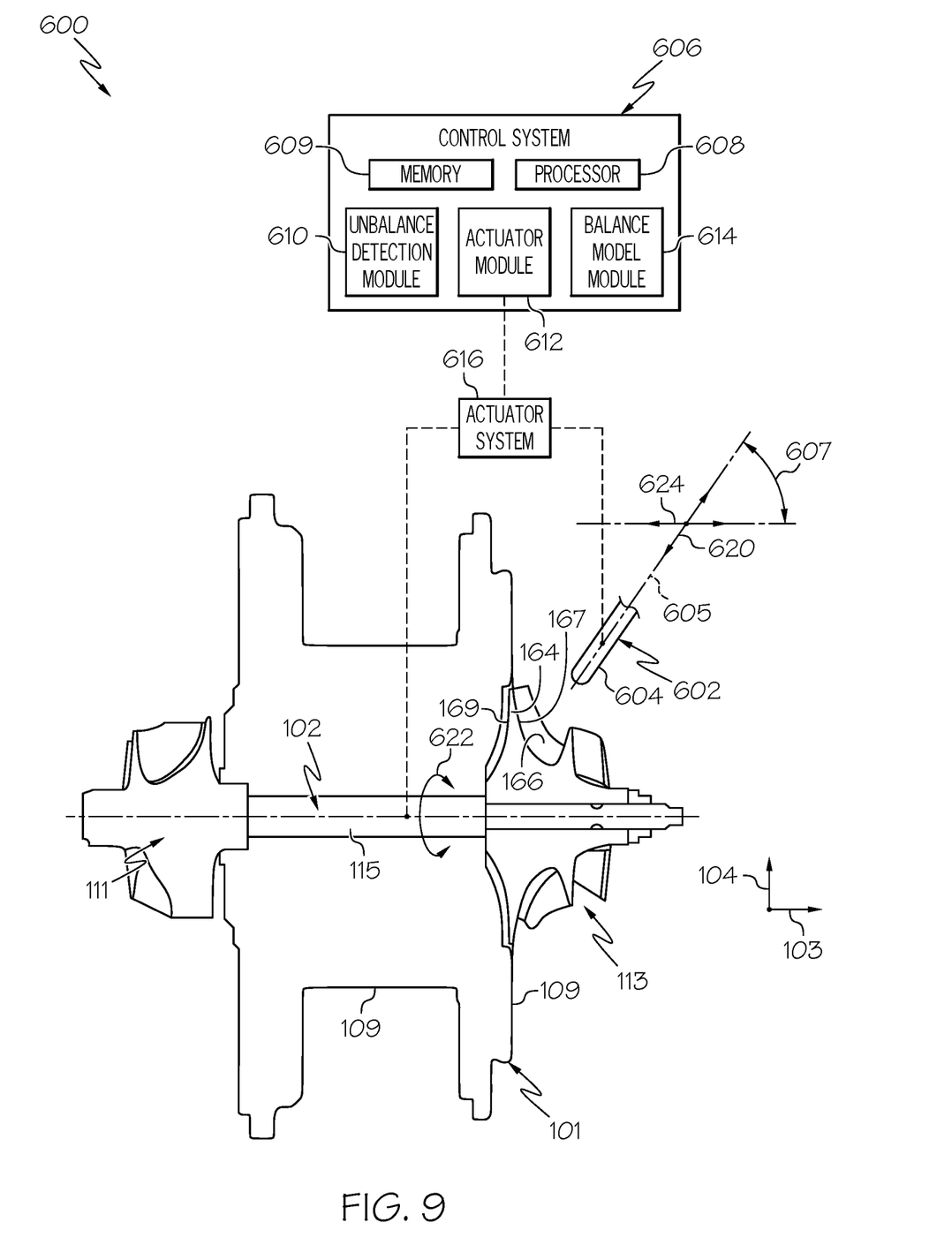
FIG. 9 is a schematic view of a balancing system used to balance the rotor of FIG. 1 according to example embodiments.

The compressor wheel 113 may also include a back wall 164. The back wall 164 may extend radially away from the hub 162 and may terminate in the radial direction at an outer rim edge 165. The outer rim edge 165 may be substantially circular, may extend continuously about the axis 103, and may be substantially centered on the axis 103. The back wall 164 may also include a front face 167 and a back face 169. Both the front face 167 and the back face 169 may extend radially between the axis 103 and the outer rim edge 165. The back face 169 may generally face toward the turbine wheel 111 of the rotor 102 (FIG. 1), and the front face 167 may face generally in the opposite direction (away from the turbine wheel 111). Both the front face 167 and the back face 169 may be contoured. For example, the front face 167 may extend substantially in the longitudinal direction (i.e., along the axis 103) proximate the hub 162, may extend substantially in the radial direction proximate the outer rim edge 165, and may have concave curvature between the hub 162 and the outer rim edge 165 (FIG. 9). The contour of the back face 169 may have slight concave contour as well.

The compressor wheel 113 may further include a plurality of blades 166a-166h. The blades 166a-166h may be relatively thin and may be attached to the front face 167 of the back wall 164. The blades 166a-166h may project from the front face 167 and may extend radially between the hub 162 and the outer rim edge 165. The blades 166 may be spaced apart substantially evenly in the circumferential direction about the axis 103. The blades 166 may have a predetermined shape, profile, size, etc. for moving the input air 131 through the compressor housing 107, compressing the input air 131, and creating the pressurized air stream 133 as the rotor 102 rotates about the axis 103.

Moreover, the compressor wheel 113 may include a plurality of inter-blade areas 168 defined between neighboring ones of the blades 166 on the front face 167 of the compressor wheel 113. One of the inter-blade areas 168 is indicated in FIGS. 2 and 3 and is defined between a first blade 166a and a second blade 166b as an example. The inter-blade area 168 may extend radially between the hub 162 and the outer rim edge 165. Also, the inter-blade area 168 may be curved as the area 168 extends radially between the hub 162 and the outer rim edge 165. Moreover, the width of the inter-blade area 168 (measured circumferentially between the neighboring blades 166a, 166b) may be tapered and may increase gradually in the radial direction from the hub 162 to the outer rim edge 165.

In addition, the compressor wheel 113 may include at least one balancing feature 170. Generally, the balancing feature(s) 170 may distribute the weight of the rotor 102 in a predetermined manner to cause the center of gravity of the rotor 102 to be located substantially on the axis 103. The balancing feature(s) 170 may ameliorate unbalance due to, for example, stack up of manufacturing and assembly tolerances relating to the rotor 102. Thus, the balancing feature(s) 170 may provide substantially balanced rotation of the rotor 102 about the axis 103.

In some embodiments, the balancing features 170 may provide balancing with respect to a first plane (e.g., a plane that is normal to the axis 103). The rotor 102 may also include at least one other balancing feature for providing balancing with respect to another plane. For example, as shown in FIG. 2, the hub 162 may include a second plane balancing feature 171, such as a notch, groove, or other aperture that balances the rotor 102 with respect to a plane that is parallel to the axis 103. Thus, the balancing features 170 and balancing feature 171 may cooperate to provide two-plane balancing for the rotor 102.

In some embodiments represented in FIG. 3, at least one balancing feature 170 may be an aperture 172 (i.e., a balancing aperture). The balancing aperture 172 may comprise an elongated recess, slot, groove, etc. formed at least partly in the front face 167 of the wheel 113. Also, the aperture 172 may be formed proximate the outer rim edge 165 within the inter-blade area 168. As shown, in some embodiments, the aperture 172 may be defined at the outer rim edge 165 such that the balancing aperture 172 intersects and defines part of the outer rim edge 165. In other words, the aperture 172 may interrupt the otherwise continuous outer rim edge 165 of the wheel 113. The depth of the aperture 172 (measured substantially parallel to the axis 103 from the front face 167) may be less than the thickness of the back wall 164. As will be discussed, this location on the wheel 113 for the balancing aperture 172 is advantageous because it is highly accessible (e.g., during a machining process). Also, there is a relatively large amount of area for the balancing aperture 172 at this location; therefore, the balancing procedure may be performed with high precision and accuracy.

The aperture 172 may be an elongate channel or recess. As shown in FIG. 3, for example, an arcuate major axis 178 of the aperture 172 may be defined along the edge 165 from a first end point 174 to a second end point 176 of the aperture 172. This axis 178 may be curved and may have a radius that is centered substantially on the axis 103. The axis 178 of the aperture 172 may be concentric with the outer rim edge 165 in some embodiments. The axis 178 may be spaced inwardly in the radial direction at a distance 179. In some embodiments, the axis 178 may represent where an area of maximum depth of the aperture 172 (the deepest area as measured parallel to the axis 103 from the front face 167).

Figure 4:
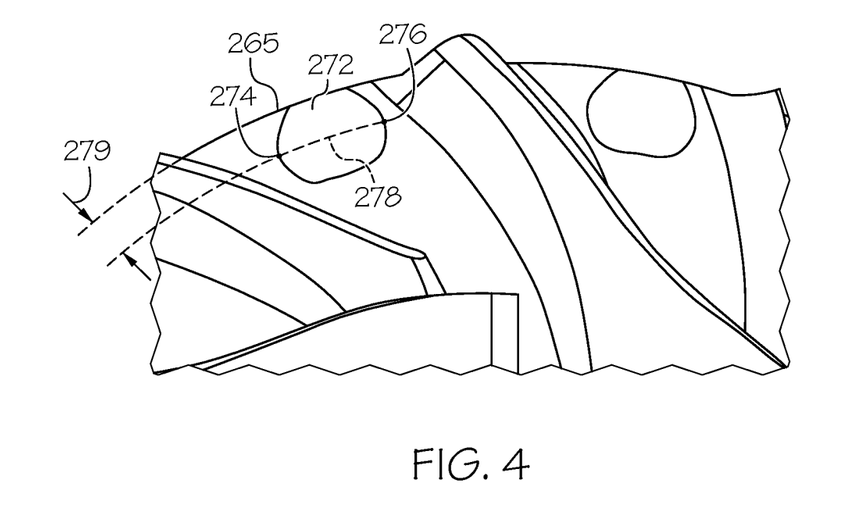
FIG. 4 is an end view of the compressor wheel with balancing features according to additional example embodiments.

Another embodiment of the balancing aperture 272 is illustrated in FIG. 4. (Components that correspond to those in FIG. 3 are indicated with corresponding reference numbers increased by 100.) The aperture 272 may be disposed radially inward and away from the outer rim edge 265. For example, the major axis 278 may be substantially concentric with the outer edge 265 and may be spaced inwardly radially at a distance 279. In some embodiments, the axis 278 may represent where the aperture 272 is deepest (i.e., the area of maximum depth of the aperture 172 measured parallel to the axis 103 from the front face 167).

Figure 5:
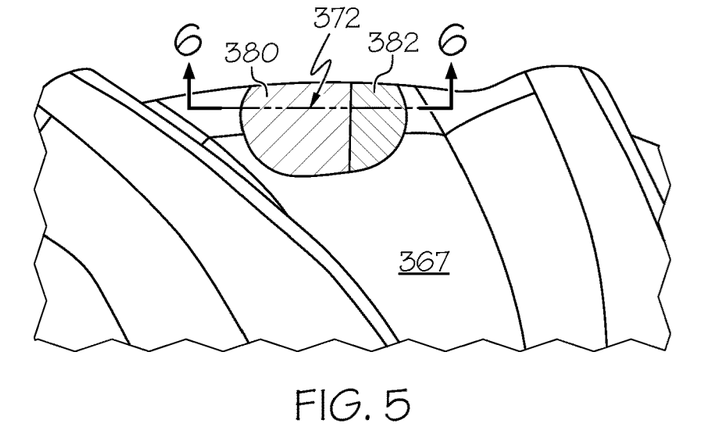
FIG. 5 is an end view of the compressor wheel with balancing feature according to additional example embodiments.
Figure 6:
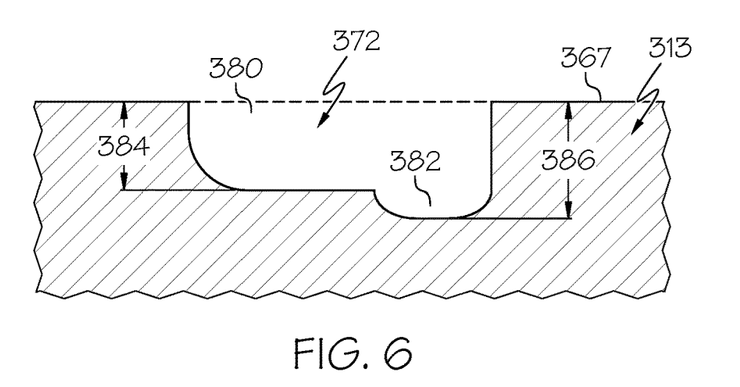
FIG. 6 is a section view of the compressor wheel and balancing feature taken along the line 6-6 of FIG. 5.

A further embodiment of the balancing aperture 372 is illustrated in FIGS. 5 and 6. (Components that correspond to those in FIG. 3 are indicated with corresponding reference numbers increased by 200.) As shown, the balancing aperture 372 may include a first portion 380 and a second portion 382. The first and second portions 380, 382 may connect and intersect each other (i.e., to share a common boundary), and the first portion 380 and the second portions 382 may be spaced apart angularly with respect to the axis 103. As shown in FIG. 6, the first portion 380 may have a first depth 384 measured along the axis 103 from the front face 367. The second portion 382 may have a second depth 386, which is greater than the first depth 384. The depths 382, 384 may be selected and predetermined for balancing the rotor.

Figure 7:
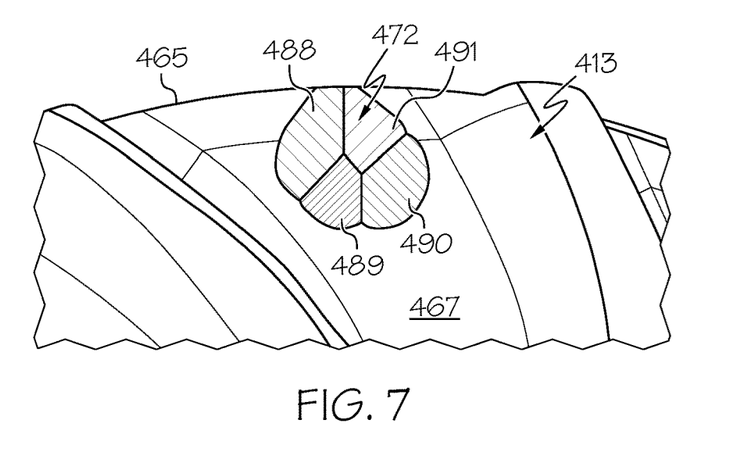
FIG. 7 is an end view of the compressor wheel with balancing features according to additional example embodiments.

Moreover, an additional embodiment of the balancing aperture 472 is illustrated in FIG. 7. (Components that correspond to those in FIG. 3 are indicated with corresponding reference numbers increased by 300.) As shown, the balancing aperture 472 may include a plurality of portions, such as a first portion 488, a second portion 489, a third portion 490, and a fourth portion 491. As shown, the portions 488-491 may be connected and intersected together with at least one of them intersecting and partially defining the outer rim edge 465. As shown in FIG. 7, the first and fourth portions 488, 491 may intersect and partially define the outer rim edge 465 while the second and third portions 489, 490 are disposed inward radially from the outer rim edge 465. The portions 488-491 may be arranged in a clustered pattern at different radial locations on the front face 467 of the wheel 413. The portions 488, 489, 490, 491 may extend to different depths into the wheel 413. The shape, arrangement, dimensions, etc. of the balancing aperture 472 may be selected and predetermined for balancing the rotor.

Accordingly, the balancing apertures 172, 272, 372, 472 may have a variety of shapes, dimensions, configurations, and/or arrangements on the rotor without departing from the scope of the present disclosure. Other variations also fall within the scope of the present disclosure.

Figure 8:
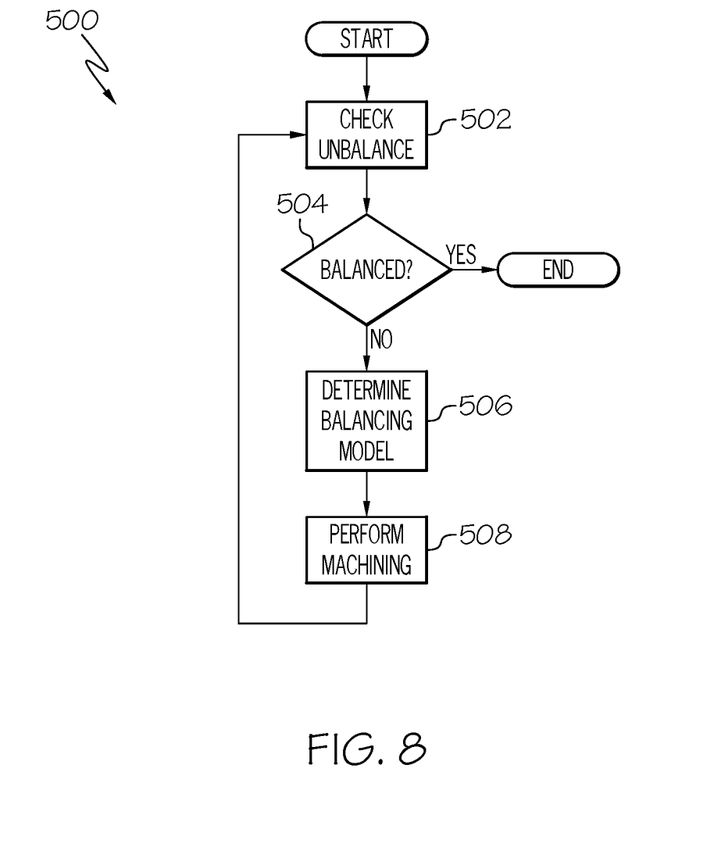
FIG. 8 is a flowchart illustrating a method of balancing the rotor of FIG. 1 according to example embodiments.

Referring now to FIG. 8, a method 500 of balancing the rotor 102 will be discussed according to example embodiments of the present disclosure. In some embodiments, a balancing apparatus 600 (FIG. 9) may be employed for performing the method 500. For purposes of discussion, formation of the balancing apertures 172 using the method 500 will be discussed primarily; however, it will be appreciated that the method 500 may be used to form any of the balancing apertures 272, 372, 472 discussed above.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the air quality control system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As shown in FIG. 9, the balancing apparatus 600 may support the rotor 102 for rotation about the axis 103. The rotor 102 may be supported within the bearing housing 109 when performing the balancing method 500. More specifically, as shown in FIG. 9, the rotor 102 may include the compressor wheel 113, the shaft 115, and the turbine wheel 111. The rotor 102 may be supported on one or more bearings and may be provided within the bearing housing 109. The front face 167 of the compressor wheel 113 may remain exposed outside the bearing housing 109 during the balancing method 500.

The balancing apparatus 600 may also include a machining tool 602. The machining tool 602 may be one of a variety of tools used to remove material from a workpiece. For example, as shown in FIG. 9, the machining tool 602 may include a cutter 604, such as a ball-end or hemispherical milling cutter. The cutter 604 may have any suitable radius and may be operatively connected to a milling machine. However, it will be appreciated that the method 500 may be employed using a different machining tool 602 without departing from the scope of the present disclosure.

The balancing apparatus 600 may further include a control system 606. The control system 606 may be configured as a computing device with at least one processor 608 and memory device 609. The control system 606 may be in communication with an actuator system 616. The control system 606 may include a hard-wired computing circuit (or circuits). The control system 606 may also be configured as a hydraulic, electrical or electro-hydraulic controller, or otherwise. As such, the control system 606 may be configured to execute various computational and control functionality with respect to the actuator system 616.

The actuator system 616 may include one or more electric motors, hydraulic actuators, pneumatic actuators, etc. In some embodiments, the actuator system 616 may selectively actuate the rotor 102 relative to the cutter 604. For example, the actuator system 616 may selectively rotate the rotor 102 about the axis 103 as indicated by arrow 622. In some embodiments, the actuator system 616 may selectively rotate the rotor 102 in either the clockwise or counterclockwise direction. Additionally, the actuator system 616 may selectively actuate the cutter 604 relative to the rotor 102. For example, the actuator system 616 may selectively rotate the cutter 604 about a cutter axis 605. In some embodiments, the cutter axis 605 may be disposed at an acute angle 607 relative to the axis 103 of the rotor 102. (The cutter axis 605 may lie within the plane of FIG. 9.) Additionally, the actuator system 616 may actuate the cutter 604 linearly (telescopingly) back and forth along the cutter axis 605 as indicated by arrow 620. Furthermore, the actuator system 616 may selectively move the cutter 604 linearly along and substantially parallel to the axis 103 of the rotor 102 as indicated by arrow 624.

The control system 606 may include various modules. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In some embodiments, the control system 606 may include an actuator module 612. The actuator module 612 may be used to generate and output control signals or control commands to the actuator system 616 for selectively moving the cutter 604 relative to the rotor 102 and/or selectively moving the rotor 102 relative to the cutter 604. The control system 606 may further include an unbalance detection module 610. The unbalance detection module 610 may be used for detecting that the rotor 102 is unbalanced for rotation about the axis 103. The unbalance detection module 610 may also detect an amount or degree to which the rotor 102 is unbalanced. In some embodiments, the unbalance detection module 610 may be operatively connected to a sensor, such as a vibration sensor, that detects unbalance in the rotation of the rotor 102 during rotation. Moreover, the control system 606 may include a balance model module 614. The balance model module 614 may be used to generate an electronic (computerized) module of the rotor 102 with balancing apertures 172 suitable for balancing the rotor 102. The module 614 may determine the size, dimension, and location for the balancing apertures 172 that will sufficiently balance the rotation of the rotor 102. Once the module 614 generates the model, it may be saved in the memory device 609.

As shown in FIG. 8, the method 500 may begin at 502 at which an unbalance test of the rotor 102 is performed. For example, the actuator module 612 may generate a control command for rotating the rotor 102 about the axis 103. The rotor 102 may be rotated continuously for a predetermined amount of time and at a predetermined angular velocity. Meanwhile, one or more vibration sensors may detect the amount of vibration in the rotor 102. The unbalance detection module 610 may receive vibration data from the sensors and process the signal and calculate and determine the unbalance in the rotor 102.

Next, at 504 of the method 500, the control system 606 may determine whether the rotor 102 is sufficiently balanced. For example, the unbalance detected at 502 may be compared to a predetermined threshold amount of unbalance. This predetermined threshold may be stored in the memory device 609 and may be accessed by the control system 606 when making the determination of 504. If the amount of unbalance detected at 502 is below the predetermined threshold (i.e., rotor is sufficiently balanced), then the method may terminate as shown in FIG. 8. In contrast, if at 504 the control system 606 determines that the detected unbalance is above the threshold, then the method 500 may continue at 506.

At 506, the balance model module 614 may be used to generate a computer model of the rotor 102 with one or more balancing apertures 172 suitable for balancing the rotation of the rotor 102. The balance model module 614 may rely on computerized logic and modeling software to determine the size, dimension, etc. of the balancing aperture(s) 172 as well as the placement of such aperture(s) 172 on the compressor wheel 113. The apertures 172 generated in the model may be sized, shaped, and placed on the compressor wheel 113 as discussed above with respect to FIG. 3 in some embodiments. Thus, one or more apertures 172 may intersect and define the outer rim edge 165 of the compressor wheel 113. However, it will be appreciated that the model may generate apertures of the type shown in FIGS. 4-7 or other apertures without departing from the scope of the present disclosure. The model may also be generated to indicate how the actuator system 616 should be used to form the aperture(s) 172. In other words, the model may be used to generate control signals for the actuator system 616 for moving the cutter 604 and/or the wheel 113 for forming the aperture(s) 172. Once the balance model module 614 generates the model of the balanced rotor 102, the model may be saved in the memory device 609. It will be appreciated that the model may also dictate the process steps for creating the balancing apertures 172.

Figure 10:
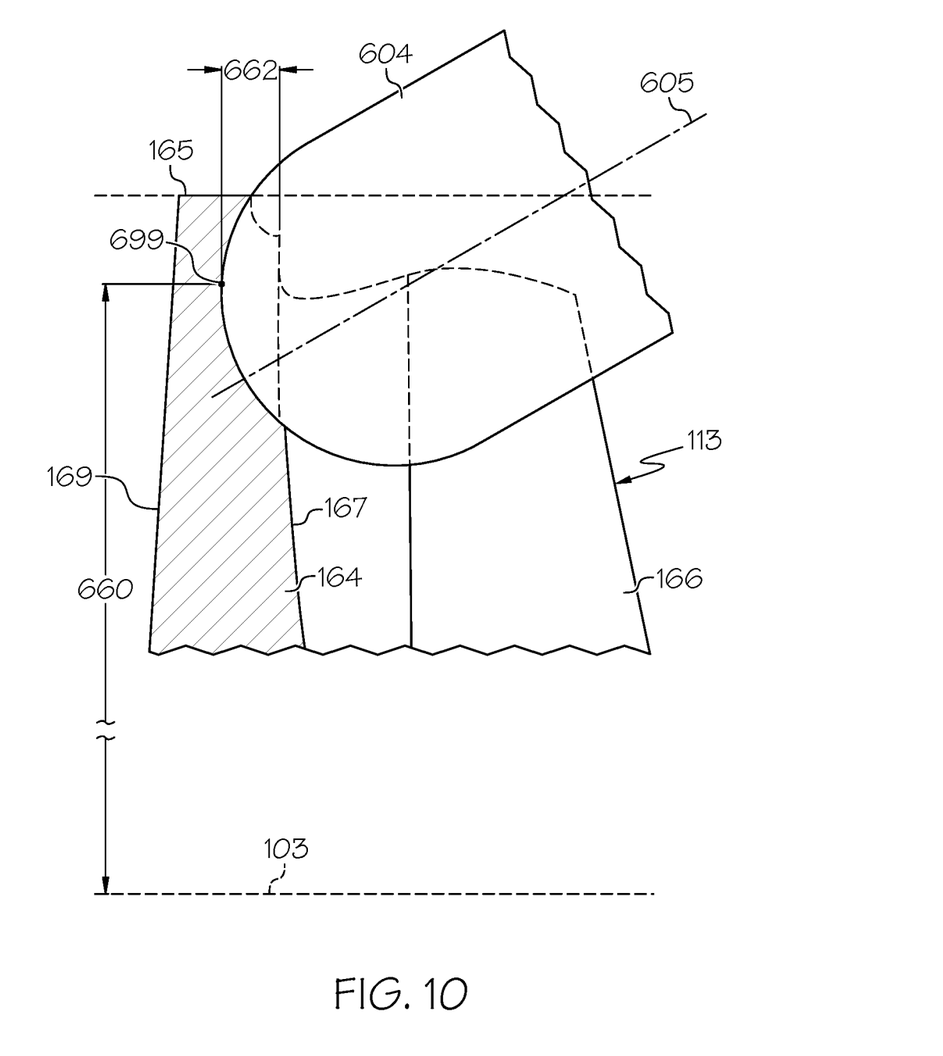
FIG. 10 is a schematic side view of the compressor wheel and a machining tool for forming the balancing feature according to example embodiments.

Next, at 508 of the method 500, the rotor 102 may be machined to create the balancing apertures 172 according to the model generated at 506. Specifically, the actuator module 612 may access the model (generated at 506 and saved in the memory device 609) and actuate the rotor 102 and/or the cutter 604 according to the model. The actuator module 612 may generate control signals for rotating the cutter 604 about the cutter axis 605 at a predetermined angular speed according to the model. The actuator module 612 may also generate and send control commands to the cutter 604 for moving the cutter 604 along the axis 605 and to position the cutter 604 at a radial distance 660 away from the axis 103 according to the model generated at 506 (FIG. 10). The actuator module 612 may also generate control commands for moving the cutter 604 along the axis 103 toward the wheel and to a predetermined depth 662 into the back wall 164 of the compressor wheel 113 according to the model. This movement may cause the cutter 604 to contact and cut material away from the compressor wheel 113 as represented in FIG. 10. Furthermore, as shown in FIG. 11, the actuator module 612 may generate control commands for rotating the rotor 102 about the axis 103 for a predetermined amount of angular displacement according to the model.

Figure 11:
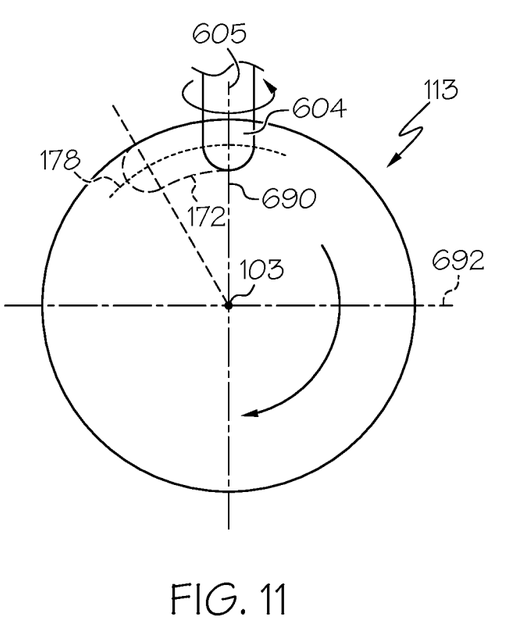
FIG. 11 is a schematic end view of the compressor wheel and machining tool according to example embodiments.

In some embodiments illustrated in FIG. 11, the compressor wheel 113 may be rotated clockwise about the axis 103, and the cutter 604 may remain at a fixed angular location relative to the axis 103 during the machining process. Specifically, the cutter axis 605 may be angularly aligned with a reference radial axis 690 of the compressor wheel 113 (FIG. 11), moved to the predetermined radial distance 660 and depth 662 (FIG. 10), and the actuator system 616 may rotate the wheel 113 clockwise for a predetermined amount of angular displacement according to the model generated at 506. As the compressor wheel 113 rotates, more material may be cut away from the compressor wheel 113, and the balancing aperture 172 may be formed. In some embodiments, the entire aperture 172 may be created in a single pass with the cutter 604 disposed at the predetermined depth 662. In other embodiments, the aperture 172 may be created through multiple passes of the cutter 604 along the outer rim edge 165 of the compressor wheel 113. In the latter example, the cutter 604 may be progressively moved deeper and deeper into the back wall 164 for each pass until the aperture 172 is fully formed.

Figure 12:
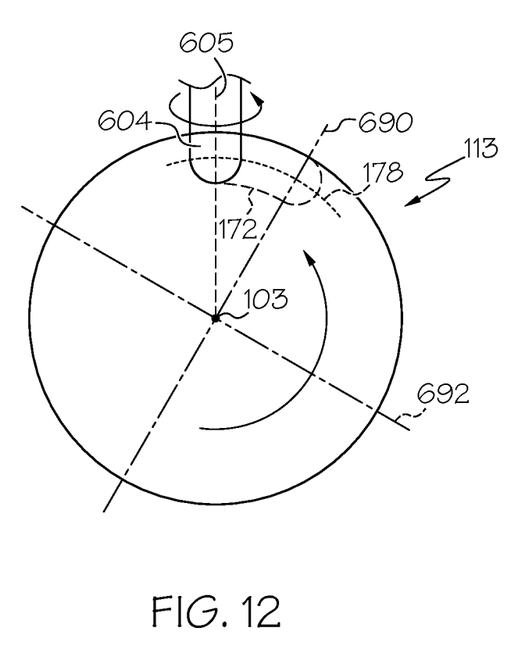
FIG. 12 is a schematic end view of the compressor wheel and machining tool according to additional example embodiments.

In other embodiments illustrated in FIG. 12, the compressor wheel 113 may be rotated counterclockwise about the axis 103 during the machining process. Specifically, the cutter axis 605 may be angularly positioned away from the reference radial axis 690 (FIG. 12), moved to the predetermined radial distance 660 and depth 662 (FIG. 10), and the actuator system 616 may rotate the wheel 113 counterclockwise for removing material and creating the aperture 172.

It will be appreciated that the model generated at 506 may dictate whether to rotate the wheel 113 clockwise or counterclockwise when creating the apertures 172. The model module 614 may determine the direction of rotation based on various factors, such as the material of the wheel 113. The direction of rotation may also be chosen to ensure that chips, burrs, and/or other machined material to move from the wheel 113 and away from the bearing housing 109. In the illustrated embodiment, clockwise movement of the wheel 113 may cause burrs to be pushed radially away from the outer rim edge 165. Counterclockwise movement of the wheel 113 may cause burrs to be pushed radially toward the outer rim edge 165; however, because the deepest point of penetration 699 of the cutter 604 is radially spaced inward from the outer rim edge 165, a concave contour profile is formed (FIG. 10), which causes the burrs to be pushed axially away from the wheel 113.

Once the aperture(s) 172 are formed at 508, the method 500 may loop back to 502, where the unbalance of the wheel 113 may be re-checked. Then, at 504, if it is determined that the wheel 113 is sufficiently balanced, then the method 500 may terminate. However, if the wheel 113 shows significant unbalance, then the method 500 may continue to 506, where an updated model may be generated, and then the apertures 172 may be re-shaped and/or new apertures 172 may be added to the wheel 113. The method 500 may continue until the wheel 113 is sufficiently balanced.

Accordingly, rotors of fluid machines may be accurately balanced according to the present teachings in an efficient and repeatable fashion. Balancing apertures may be formed proximate the outer rim edge in an inter-blade area of the back wall of a compressor wheel. This location is highly accessible, thereby increasing efficiency of the balancing method. Moreover, there is typically a significant amount of material at this location, which allows for precise balancing. Finally, disposing the balancing aperture in this location is unlikely to detrimentally affect the strength of the wheel.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A method of balancing a rotor for a fluid machine comprising:

determining a balancing model for a wheel that is supported for rotation about an axis of rotation, the wheel including a back wall with a front face, a back face, and an outer rim edge, a plurality of blades, the plurality of blades being attached to the back wall and spaced apart about the axis of rotation, and an inter-blade area on the back wall defined between neighboring ones of the plurality of blades; and removing material, with a removal tool, from the wheel at the inter-blade area according to the determined balancing model, the removing material including rotating at least one of the wheel and the removal tool relative to the other about the axis of rotation, and producing a balancing aperture in the inter-blade area on the front surface of the back wall at the outer rim edge, the balancing aperture extending along an arcuate major axis that has a radius that is substantially centered on the axis of rotation, the balancing aperture having a plurality of portions including at least a first portion and a second portion, the first portion having a first depth measured from the front face along the axis of rotation, the second portion having a second depth measured from the front face along the axis of rotation, the second depth being different from the first depth; and wherein at least one of the first portion and the second portion of the balancing aperture intersects and defines part of the outer rim edge.

2. The method of claim 1, wherein removing material includes:

driving the wheel in rotation about the axis of rotation while holding the removal tool at a fixed angular position relative to the axis of rotation.

3. The method of claim 2, wherein determining the balancing model includes determining a rotational direction of the wheel;

and wherein removing material includes driving the wheel according to the determined rotational direction.

4. The method of claim 1, further comprising:

moving at least one of the wheel and the removal tool radially relative to the other to a predetermined radial position according to the balancing model;

moving at least one of the wheel and the removal tool longitudinally relative to the other with respect to the axis of rotation to a predetermined longitudinal position according to the balancing model; and rotating at least one of the wheel and the removal tool relative to the other about the axis of rotation across a predetermined amount of angular displacement according to the balancing model.

5. The method of claim 1, wherein removing material from the wheel includes performing a first pass to remove a first amount of material from the wheel; and further comprising performing a second pass to remove a second amount of material from the wheel.

* * * * *